United States Patent Office 3,267,108
Patented August 16, 1966

3,267,108
1-AMINO-α-(CHLOROPHENYL)BENZYL-PIPERIDINES
Robert W. Hamilton, Wilmette, and Kurt J. Rorig, Glenview, Ill., assignors to G. D. Searle & Co., Chicago, Ill., a corporation of Delaware
No Drawing. Filed June 22, 1964, Ser. No. 377,096
6 Claims. (Cl. 260—293)

The application for Letters Patent securing the invention hereinafter described and claimed is a continuation-in-part of applicants' prior copending application, Serial No. 248,873, filed January 2, 1963, and now matured to U.S. 3,158,609.

This invention relates to 1-amino-α-(halophenyl)benzylpiperidines and processes for the preparation thereof. More particularly, this invention provides novel, useful, and unobvious hydrazines of the formula

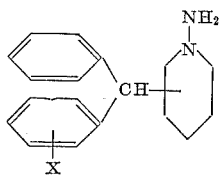

wherein X represents halogen—preferably fluorine, chlorine, or bromine.

Equivalent to the above-enformulated hydrazines for the purposes of this invention are corresponding non-toxic acid addition salts, the composition of which can be depicted thus

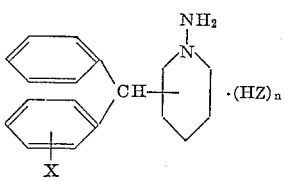

wherein X has the meaning previously assigned; Z represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $n$ represents a postive integer less than 3.

The compounds to which this invention relates (including the aforesaid acid addition salts) are characterized by valuable pharmacological properties. Thus, for example, they inhibit appetite; reduce exogenously induced hypercholesterolemia; counteract edema, rubor, and granuloma-formation associated with the inflammatory response to tissue insult; prevent cotyledenous seed germination; and are antibiotics effective against bacteria such as *Diplococcus pneumoniae*, protozoa such as *Tetrahymena gelleii*, and fungi such as *Trichophyton mentagrophytes*. On the other hand, they are unexpectedly free of the psychomotor-stimulatory and diuretic side-effects which characterize corresponding non-halogenated analogs such as 1-amino-4-(diphenylmethyl)piperidine hydrochloride and, perhaps as a corollary, they are, representatively, only about half as toxic.

Preparation of the subject hydrazines proceeds by reduction of the corresponding nitroso compounds

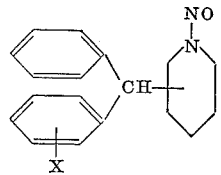

(X being defined as before) with lithium aluminum hydride in a boiling mixture of tetrahydrofuran and ether. The corresponding acid addition salts are obtained by admixing stoichiometric quantities of the hydrazines—preferably in ether or similar solvent medium—with any of the various inorganic and strong organic acid in which the anionic component can be represented by Z as hereinabove defined.

The following examples described in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

Example 1

A. *4-(p-chloro-α-phenylbenzyl)piperidine.*—A solution of 14 parts of 4-(p-chloro-α-phenylbenzyl)pyridine in 250 parts of acetic acid is heated, with agitation, at 47° under approximately 4 atmospheres of hydrogen and in the presence of 2 parts of platinum oxide catalyst for 2 hours. The resultant mixture is filtered, and the filtrate is stripped of solvent by vacuum distillation. The residue is poured into 3 volumes of ice water, and the mixture thus obtained is made alkaline with sodium hydroxide. This mixture, in turn, is extracted with ether. The ether extract, dried over anhydrous potassium carbonate and distilled at 0.4 mm. pressure affords 4-(p-chloro-α-phenylbenzyl)piperidine at about 170–175°.

B. *4 - (p - chloro-α-phenylbenzyl)piperidine hydrochloride.*—To a solution of approximately 14 parts of 4-(p-chloro-α-phenylbenzyl)piperidine in 100 parts of butanone is added just sufficient 2-propanolic hydrogen chloride to render the solution acid. The precipitate thrown down is 4 - (p - chloro - α - phenylbenzyl)piperidine hydrochloride which, filtered off and dried in air, melts at 216–219° (with gas evolution).

C. *4 - (p-chloro-α-phenylbenzyl)-1-nitrosopiperidine.*—To a solution of 98 parts of 4-(p-chloro-α-phenylbenzyl)piperidine hydrochloride in a mixture of 56 parts of water with 225 parts of ethanol at 70° is added, during 1 hour and with continuing agitation, a solution of 44 parts of sodium nitrite and 88 parts of water. Concurrently, sufficient concentrated hydrochloric acid is introduced to insure that the reaction mixture is slightly acid throughout the course of the sodium nitrite addition. When the addition is complete, the reaction mixture is cooled to around 0°; and the insoluble solids are thereupon filtered off and taken up in benzene. The benzene solution is washed with dilute hydrochloric acid, dried over anhydrous calcium sulfate, and stripped of solvent by vacuum distillation. The residue solidifies on standing and melts at 160–165°. The product thus isolated is 4-(p-chloro-α-phenylbenzyl)-1-nitrosopiperidine.

D. *1 - amino-4-(p-chloro-α-phenylbenzyl)piperidine.*—To a solution of 70 parts of lithium aluminum hydride in 10,000 parts of ether at the boiling point, under reflux is added, with agitation during 45 minutes, a solution of 360 parts of 4-(p-chloro-α-phenylbenzyl)-1-nitrosopiperidine in 2000 parts of tetrahydrofuran. Agitation is continued for 1 hour after the addition is complete, at which point 74 parts of water and a mixture of 55 parts of aqueous 20% sodium hydroxide with 258 parts of water are consecutively mixed in. The mixture is filtered, and the solids thus separated are washed with hot tetrahydrofuran and discarded. Filtrate and washings are combined and stripped of solvent by vacuum distillation. The residue is taken up in benzene, and the benzene solution is extracted with dilute hydrochloric acid. The acid extract is made alkaline with aqueous sodium hydroxide, and the resultant mixture is extracted with ether. The ether extract, dried over anhydrous potassium carbonate and stripped of solvent by distillation, affords 1-amino-4-(p-chloro-α-phenylbenzyl)piperidine as the residue, which is a light brown oil.

E. *1-amino-4-(p-chloro-α-phenylbenzyl)piperidine hydrochloride.*—An etheral solution of 1-amino-4-(p-chloro-α-phenylbenzyl)piperidine, made slightly acid with 2-propanolic hydrogen chloride, affords 1-amino-4-(p-chloro-α-phenylbenzyl)piperidine hydrochloride as a colorless crystalline precipitate which, filtered off and dried in air, sinters at 167° and melts at 171° (with gas evolution). The product has the formula

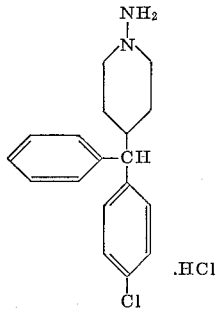

*Example 2*

A. *α-(p-chlorophenyl)-α-phenyl-3-pyridinemethanol.*—To a solution of 92 parts of 3-benzoylpyridine in 800 parts of ether is added, during 1 hour with continuous agitation at room temperatures, a solution of 103 parts of p-chlorophenylmagnesium bromide in 300 parts of ether. To the resultant mixture is added a solution of 104 parts of ammonium chloride in 416 parts of water. The ether layer is separated and extracted with dilute hydrochloric acid. The extract is rendered alkaline by addition of aqueous sodium hydroxide and then extracted with ether. This extract is dried over potassium carbonate and distilled at 0.4 mm. pressure. At about 205–215° there is obtained α-(p-chlorophenyl)-α-phenyl-3-pyridinemethanol.

B. *3-(p-chloro-α-phenylbenzyl)pyridine.*—A mixture of 30 parts of α-(p-chlorophenyl)-α-phenyl-3-pyridinemethanol, 60 parts of glacial acetic acid, 18 parts of concentrated hydrochloric acid, and 60 parts of 47% hydriodic acid is heated at the boiling point under reflux for 2 minutes, then thoroughly mixed into a solution of 24 parts of sodium hydrosulfite in 180 parts of water. The resultant mixture is made alkaline with sodium hydroxide and then extracted with ether. The ether extract is dried over anhydrous potassium carbonate and distilled at 0.4 mm. pressure. At about 167–173° an oil is obtained which is the desired 3-(p-chloro-α-phenylbenzyl)pyridine.

C. *3-(p-chloro-α-phenylbenzyl)piperidine.*—Substitution of 14 parts of 3-(p-chloro-α-phenylbenzyl)pyridine for the 4-(p-chloro-α-phenylbenzyl)pyridine called for in Example 1A affords, by the procedure there detailed, 3-(p-chloro-α-phenylbenzyl)piperidine, boiling at about 168–171° at 0.2 mm.

D. *3-(p-chloro-α-phenylbenzyl)piperidine hydrochloride.*—Substitution of 14 parts of 3-(p-chloro-α-phenylbenzyl)piperidine for the 4-(p-chloro-α-phenylbenzyl)

piperidine called for in Example 1B affords, by the procedure there detailed, 3-(p-chloro-α-phenylbenzyl)piperidine hydrochloride.

E. *3-(p-chloro-α-phenylbenzyl)-1-nitrosopiperidine.* — Substitution of 98 parts of 3-(p-chloro-α-phenylbenzyl)piperidine hydrochloride for the 4-(p-chloro-α-phenylbenzyl)piperidine hydrochloride called for in Example 1C affords, by the procedure there detailed, 3-(p-chloro-α-phenylbenzyl)-1-nitrosopiperidine.

F. *1 - amino-3-(p-chloro-α-phenylbenzyl)piperidine.* — Substitution of 360 parts of 3-(p-chloro-α-phenylbenzyl)-1-nitrosopiperidine for the 4-(p-chloro-α-phenylbenzyl)-1-nitrosopiperidine called for in Example 1D affords, by the procedure there detailed, 1-amino-3-(p-chloro-α-phenylbenzyl)piperidine. The product has the formula

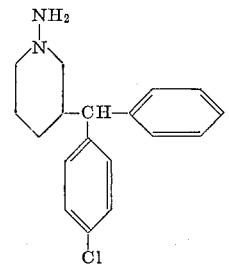

*Example 3*

A. *2-(p-chloro-α-phenylbenzyl)-1-nitrosopiperidine.* — Substitution of 98 parts of 2-(p-chloro-α-phenylbenzyl)piperidine hydrochloride for the 4-(p-chloro-α-phenylbenzyl)piperidine hydrochloride called for in Example 1C affords, by the procedure there detailed, 2-(p-chloro-α-phenylbenzyl)-1-nitrosopiperidine.

B. *1-amino-2 - (p-chloro-α-phenylbenzyl)piperidine.* — Substitution of 360 parts of 2-(p-chloro-α-phenylbenzyl)-1-nitrosopiperidine for the 4-(p-chloro-α-phenylbenzyl)-1-nitrosopiperidine called for in Example 1D affords, by the procedure there detailed, 1-amino-2-(p-chloro-α-phenylbenzyl)piperidine. The product has the formula

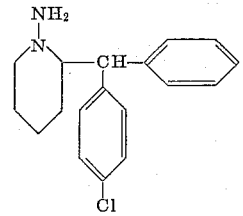

*Example 4*

A. *α-(m-Chlorophenyl) - α - phenyl-4-pyridinemethanol.*—To a solution of 92 parts of 4-benzoylpyridine in 800 parts of ether is added, during 1 hour with continuous agitation at room temperatures, a solution of 103 parts of m-chlorophenylmagnesium bromide in 300 parts of ether. To the resultant mixture is added a solution of 104 parts of ammonium chloride in 416 parts of water. The solid precipitate thrown down is α-(m-chlorophenyl)-α-phenyl-4-pyridinemethanol, which is isolated by filtration and further purified by washing with water. The crystals melt at about 172–180°.

B. *4-(m-chloro - α - phenylbenzyl)pyridine.*—Substitution of 30 parts of α-(m-chlorophenyl)-α-phenyl-4-pyridinemethanol for the α-(p-chlorophenyl)-α-phenyl-3-pyridinemethanol called for in Example 2B affords, by the procedure there detailed, 4-(m-chloro-α-phenylbenzyl)pyridine, which boils at about 165–171° at 0.15 mm.

C. *4-(m-chloro-α-phenylbenzyl)piperidine.* — Substitution of 14 parts of 4-(m-chloro-α-phenylbenzyl)pyridine for the 4-(p-chloro-α-phenylbenzyl)pyridine called for in Example 1A affords, by the procedure there detailed, 4-(m-chloro-α-phenylbenzyl)piperidine, which boils at about 160°–170° at 0.2 mm.

D. *4-(m - chloro-α-phenylbenzyl)piperidine hydrochloride.*—Substitution of 14 parts of 4-(m-chloro-α-phenylbenzyl)piperidine for the 4-(p-chloro-α-phenylbenzyl)piperidine called for in Example 1B affords, by the procedure there detailed, 4-(m-chloro-α-phenylbenzyl)piperidine hydrochloride, which melts at 247–250°.

E. *4-(m-chloro-α-phenylbenzyl)-1-nitrosopiperidine.*—Substitution of 98 parts of 4-(m-chloro-α-phenylbenzyl)piperidine hydrochloride for the 4-(p-chloro-α-phenylbenzyl)piperidine hydrochloride called for in Example 1C affords, by the procedure there detailed, 4-(m-chloro-α-phenylbenzyl)-1-nitrosopiperidine.

F. *1-amino-4-(m-chloro-α-phenylbenzyl)piperidine.*—Substitution of 360 parts of 4-(m-chloro-α-phenylbenzyl)-1-nitrosopiperidine for the 4-(p-chloro-α-phenylbenzyl)-1-nitrosopiperidine called for in Example 1D affords, by the procedure there detailed, 1-amino-4-(m-chloro-α-phenylbenzyl)piperidine. The product has the formula

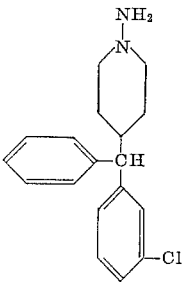

*Example 5*

A. *α-(o-chlorophenyl)-α-phenyl-3-pyridinemethanol.*—Substitution of 103 parts of o-chlorophenylmagnesium bromide for the p-chlorophenylmagnesium bromide called for in Example 4A affords, by the procedure there detailed, α-(o-chlorophenyl)-α-phenyl-3-pyridinemethanol.

B. *3-(o-chloro-α-phenylbenzyl)pyridine.*—Substitution of 30 parts of α-(o-chlorophenyl)-α-phenyl-3-pyridinemethanol for the α-(p-chlorophenyl)-α-phenyl-3-pyridinemethanol called for in Example 2B affords, by the procedure there detailed, 3-(o-chloro-α-phenylbenzyl)pyridine.

C. *3-(o-chloro-α-phenylbenzyl)piperidine.*—Substitution of 14 parts of 3-(o-chloro-α-phenylbenzyl)pyridine for the 4-(p-chloro-α-phenylbenzyl)pyridine called for in Example 1A affords, by the procedure there detailed, 3-(o-chloro-α-phenylbenzyl)piperidine.

D. *3-(o-chloro-α-phenylbenzyl)piperidine hydrochloride.*—Substitution of 14 parts of 3-(o-chloro-α-phenylbenzyl)piperidine for the 4-(p-chloro-α-phenyl-benzyl)piperidine called for in Example 1B affords, by the procedure there detailed, 3-(o-chloro-α-phenylbenzyl)piperidine hydrochloride.

E. *3-(o-chloro-α-phenylbenzyl)-1-nitrosopiperidine.*—Substitution of 98 parts of 3-(o-chloro-α-phenylbenzyl)piperidine hydrochloride for the 4-(p-chloro-α-phenylbenzyl)piperidine hydrochloride called for in Example 1C affords, by the procedure there detailed, 3-(o-chloro-α-phenylbenzyl)-1-nitrosopiperidine.

F. *1-amino-3-(o-chloro-α-phenylbenzyl)piperidine.*—Substitution of 360 parts of 3-(o-chloro-α-phenylbenzyl)-1-nitrosopiperidine for the 4-(p-chloro-α-phenylbenzyl)-1-nitrosopiperidine called for in Example 1D affords, by the procedure there detailed, 1-amino-3-(o-chloro-α-phenylbenzyl)piperidine. The product has the formula

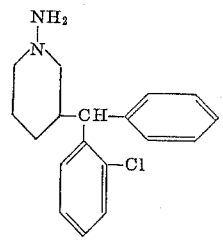

What is claimed is:
1. A compound of the formula

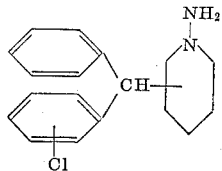

2. 1-amino-4-(p-chloro-α-phenylbenzyl)piperidine.
3. 1-amino-3-(p-chloro-α-phenylbenzyl)piperidine.
4. 1-amino-2-(p-chloro-α-phenylbenzyl)piperidine.
5. 1-amino-4-(m-chloro-α-phenylbenzyl)piperidine.
6. 1-amino-3-(o-chloro-α-phenylbenzyl)piperidine.

References Cited by the Examiner
UNITED STATES PATENTS

| | | | |
|---|---|---|---|
| 2,826,583 | 3/1958 | Hoffman et al. | 260—293 |
| 2,957,879 | 10/1960 | Hoffman et al. | 260—293 |
| 3,128,276 | 4/1964 | Rorig | 260—293 |

WALTER A. MODANCE, *Primary Examiner.*

A. D. SPEVACK, *Assistant Examiner.*